Nov. 24, 1970     D. J. FLESHER     3,541,843
METHOD AND APPARATUS FOR MEASURING FABRIC SOFTNESS
Filed Dec. 29, 1967     3 Sheets-Sheet 1
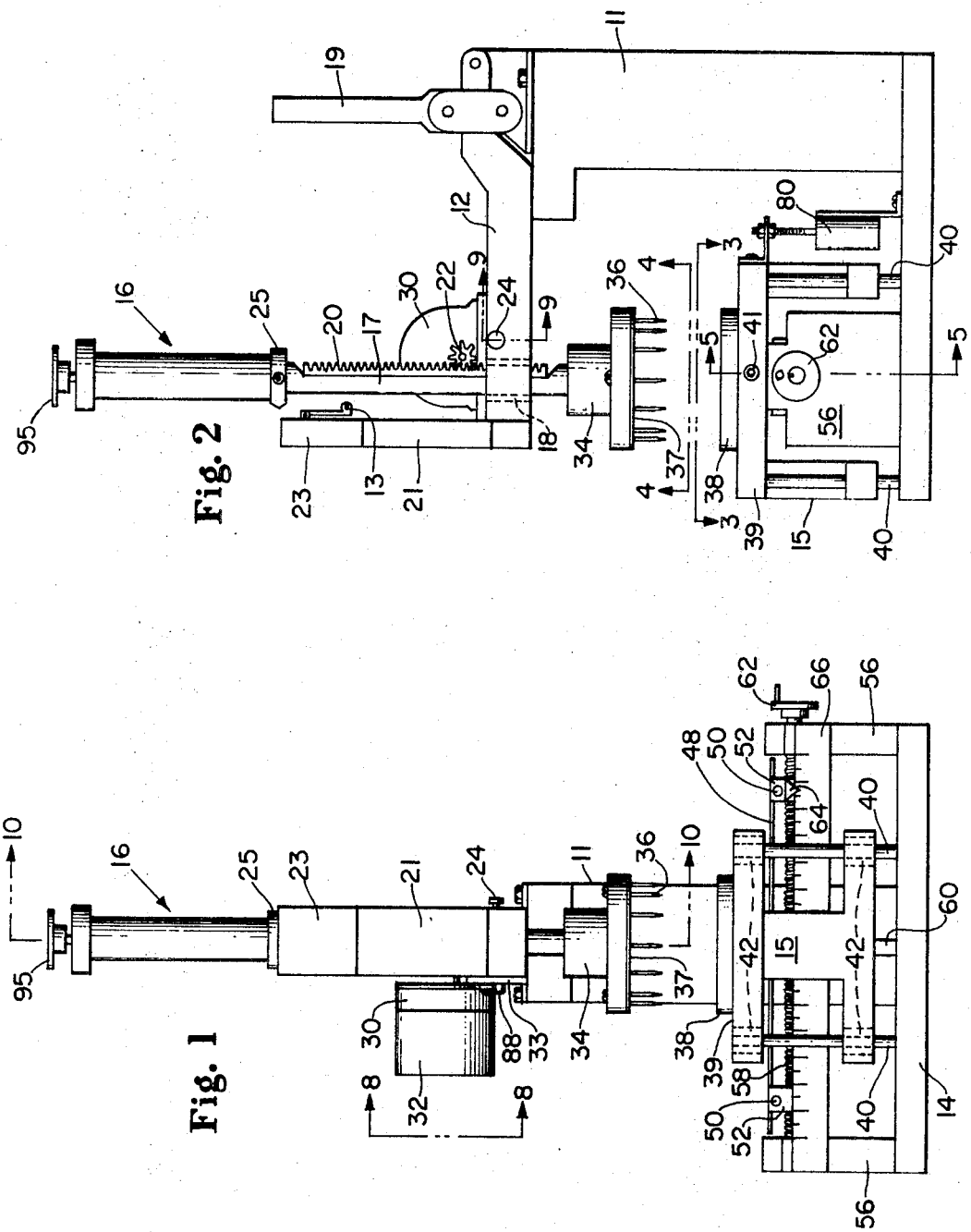
INVENTOR.
Danny Joe Flesher
BY Richard C. Witte
ATTORNEY

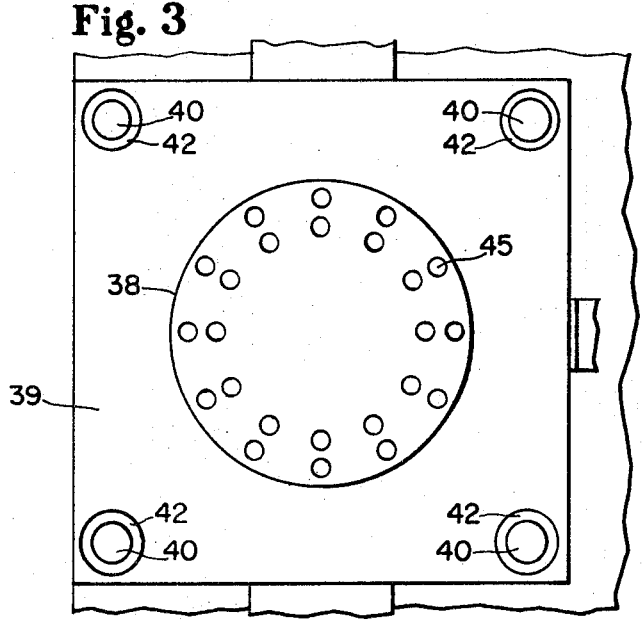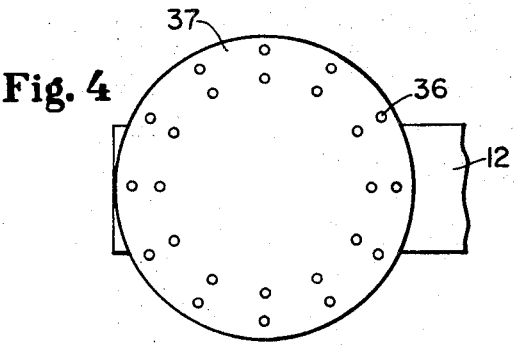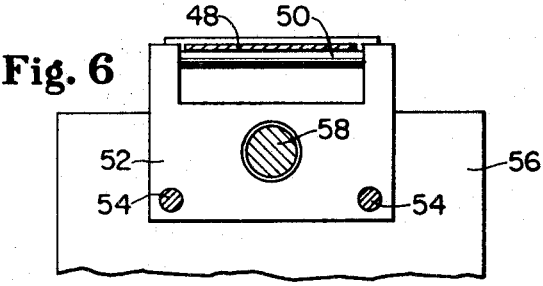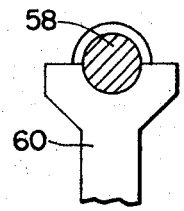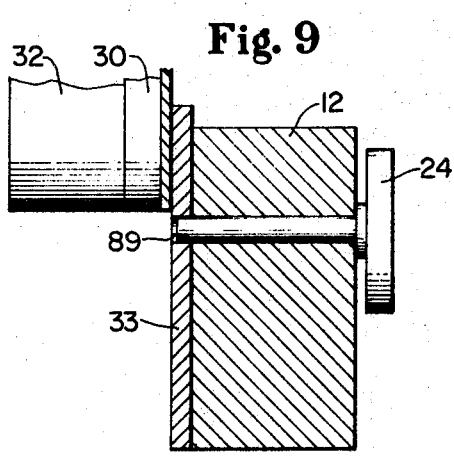

Nov. 24, 1970  D. J. FLESHER  3,541,843
METHOD AND APPARATUS FOR MEASURING FABRIC SOFTNESS
Filed Dec. 29, 1967  3 Sheets-Sheet 3

INVENTOR.
Danny Joe Flesher

BY Richard C. Witte

ATTORNEY

United States Patent Office 3,541,843
Patented Nov. 24, 1970

3,541,843
METHOD AND APPARATUS FOR MEASURING FABRIC SOFTNESS
Danny Joe Flesher, Hamilton, Ohio, assignor to The Procter & Gamble Company, Cincinnati, Ohio, a corporation of Ohio
Filed Dec. 29, 1967, Ser. No. 694,608
Int. Cl. G01l 5/04; G01n 3/48
U.S. Cl. 73—81                                                                 5 Claims

ABSTRACT OF THE DISCLOSURE

A method of measuring fabric softness comprising measuring the force resisting penetration of a fabric sample by one or more pointed pins and an apparatus for practicing the said method which comprises a plurality of pointed pins drivingly interconnected with a constant speed electric motor, a receiver containing holes spaced to receive the pins, and a force measuring device.

FIELD OF THE INVENTION

This invention relates to a method and apparatus for measuring the softness of fabrics and, more particularly, for assessing fabric softness by measuring its resistance to penetration by sharp pins.

BACKGROUND OF THE INVENTION

Fabric softness is a quality which is related to efficacy of certain home laundry products, such as fabric softeners, soaps, and detergents and which affects consumer acceptance of such products. The common manner of evaluating the softness quality of fabrics cleaned or treated by such products involves tactile examination, a highly subjective measure. Laundry product manufacturers, to assure consumer acceptance of or preference for their products necessarily conduct testing aimed at maintaining and improving the softness quality, among other characteristics, of fabrics washed or treated with their products. Tests of product effectiveness, in keeping with the performance measure employed by the housewife, must correlate with her evaluation. Consequently, one preferred method of performance measurement involves submitting controlled fabric samples to panels of experts, qualified through experience, for comparative grading of the tactile softness of the samples which have been washed or treated by various soap or detergent compounds or fabric treatments.

Subjective panel testing of fabric softness can become a costly and time-consuming endeavor. It is desirable, therefore, that a mechanical method and device for practicing the method be provided which will measure the relative softness of fabric samples and at the same time be correlative with subjective determinations of the softness quality by human test panels and ultimately by the laundry product consumer. Several methods and associated apparatus are available for mechanically measuring fabric softness, all of which are desirably subject to improvement. One method involves measuring resistance of a fabric sample to folding and is disclosed in U.S. Pat. 2,718,142. issued Sept. 20, 1953 to M. A. Schwartz and Kathryn E. Nothnagle. Another method comprises measuring surface lubricity of a fabric sample by sled techniques; that is, by determining the coefficient of friction between the fabric sample and an object sliding on the fabric surface. Basic experimental techniques for obtaining such friction data are outlined in Terence, Lemon and Stephenson, Analytical Experimental Physics, Sect. 2.12 (3rd Ed. 1956). A third method of mechanical softness measurement measures the combined effect of fabric fiber flexibility and surface lubricity and is disclosed in U.S. Pat. 3,151,483, issued Oct. 6, 1967 to C. H. Plummer.

None of the prior art methods of measuring fabric softness cited above yield results which can be consistently correlated with subjective panel tests because they do not measure the effect of the total complexity of the mechanisms which contribute to the overall subjective quality called softness. Additionally, results obtained with the methods and apparatus of the cited Schwartz and Plummer patents, for example, are subject to variations caused by variations in dimensions of a fabric sample. It is desirable, therefore, to provide a method of measuring fabric softness which more completely measures the effect of the total complexity of fabric characteristics relating to softness and in which physical size of the sample is not a variable.

OBJECTS OF THE INVENTION

It is therefore an object of this invention to provide a method of measuring fabric softness which can be mechanized and which exhibits a high correlation of results with tactile evaluation.

A further object of the present invention is to provide a softness testing method which can be practiced independently of fabric sample dimensions.

The present invention comprises measuring the force required to penetrate a fabric sample with one or a plurality of pointed pins. It is a further object of the invention therefore to provide an apparatus which will repeatably measure such a force without regard to sample size and without a necessity of maintaining tautness in the sample or otherwise specially preparing the sample for use with the machine.

SUMMARY OF THE INVENTION

Briefly stated, the process of this invention comprises the steps of piercing a fabric sample with one or more pointed pins and measuring the force required to cause penetration. The force measurement obtained can then be compared to that required to pierce a standard or "zero" sample, or alternatively, comparison can be made among several "non-zero" samples.

Coarse comparison of penetration forces might be made by tacit sensing. More accurate measurement can be obtained with mechanical apparatus which causes a pin or pins to penetrate the fabric sample and measures the penetration force. The apparatus of this invention is such a device comprising one or more pointed pins mounted on a movable head, a receiver containing a like number of holes to receive said pins, a means of driving the pins through a fabric sample and into said holes, and a means of measuring the force required to penetrate the fabric sample.

BRIEF DESCRIPTION OF THE DRAWINGS

While the specification concludes with claims particularly pointing out and distinctly claiming the subject matter of this invention, it is believed the invention will be better understood by reference to the following explanation and accompanying drawings in which:

FIG. 1 is a front elevational view of the apparatus of this invention;

FIG. 2 is a side elevational view of the same apparatus as seen from the right of FIG. 1;

FIG. 3 is a fragmentary view of the apparatus taken along the line 3—3 of FIG. 2;

FIG. 4 is a fragmentary view of the apparatus taken along the line 4—4 of FIG. 2;

FIG. 6 is a fragmentary sectional view of the apparatus taken along the line 6—6 of FIG. 5;

FIG. 7 is a fragmentary sectional view of the apparatus taken along the line 7—7 of FIG. 5;

FIG. 9 is a fragmentary sectional view taken along line 9—9 of FIG. 2; and

DESCRIPTION OF THE PREFERRED EMBODIMENTS

Figure 5:
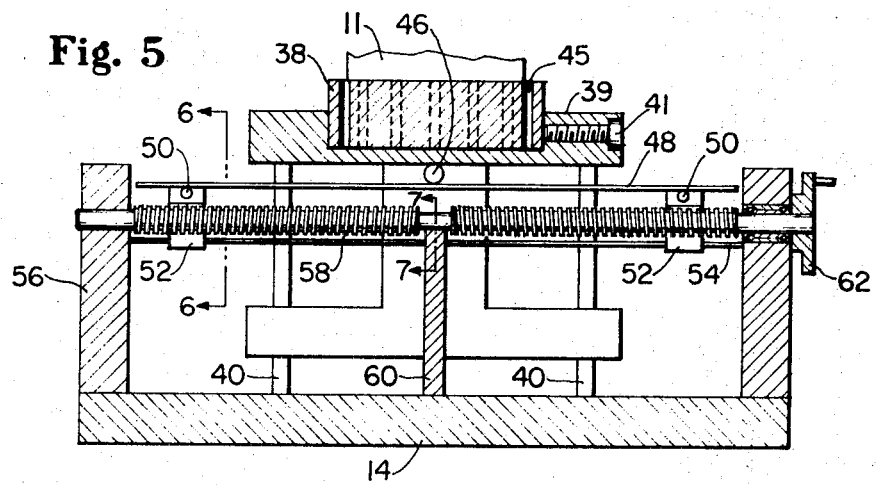
FIG. 5 is a fragmentary sectional view of the apparatus taken along the line 5—5 of FIG. 2.

Referring to FIGS. 1 and 2 of the drawings, the primary structural members of the apparatus comprise a base plate 14, a vertical column 11 fastened to the base plate by welding or other means, and a drive support member 12 pivotally fastened to the vertical column 11 and held in horizontal position by a toggle clamp 19. The drive support member 12 extends horizontally from the top of the vertical column 11 across the base plate 14. The free end of the drive support member 12 is configured to receive a bearing 18 (see FIG. 10 which shows the bearing installation in cross-section), switch mounting means 21, and a drive unit mounting plate 33 (see FIG. 8).

Figure 10:
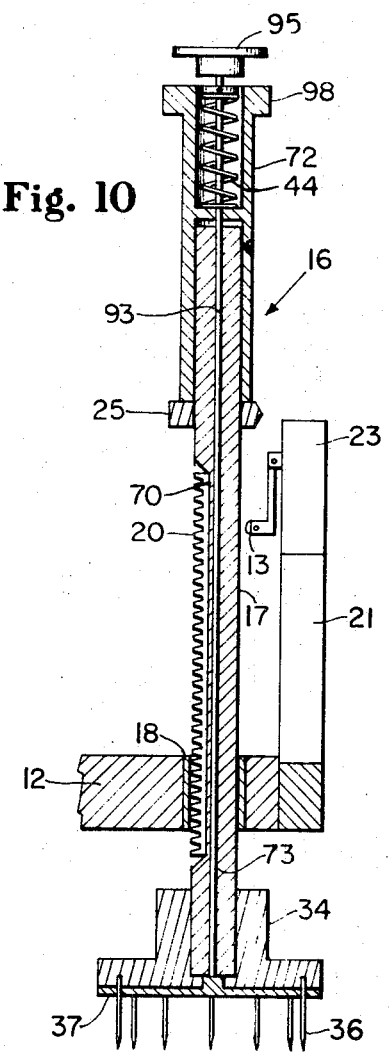
FIG. 10 is a fragmentary sectional view taken along line 10—10 of FIG. 1.

Slideably mounted in the bearings 18 is a head assembly 16 which is most completely shown in FIG. 10. The head assembly 16 comprises a shaft 17, a pin mounting hub 34, pins 36, fabric removal plate 37, rod 93, knob 95, spring 44, a rack 20, a collar 25, and sleeve 72.

The shaft 17 is in the central member of the head assembly 16. It contains a milled flat 70 on which the rack 20 is mounted and a central bore 73 through which the rod 42 passes.

The sleeve 72 is fastened to the upper portion of the shaft 17 with a set screw or other means and houses the spring 44. A rim 98 is provided on the upper end of the sleeve 72 to facilitate positive manual gripping of the head assembly 16.

The sub-assembly comprising knob 95, fabric removal plate 37, and rod 93 interconnecting the knob 95 and plate 37 is biased to an upward position relative to the balance of the head assembly by spring 44 and provides a means for readily removing a fabric sample which has been impaled on the pins 36. The plate 37 contains holes which are slightly larger than and arranged in the same pattern as the pins 36, the plate 37 being slideably mounted over the said pins 36. When the knob 95 is depressed against the force of the spring 44, the plate 37 is caused to move downwardly with respect to the pins 36 carrying the sample with it and thereby releasing the sample from engagement with the pins.

A pin mounting hub 34 is threaded or otherwise fastened to the lower end of the shaft 17 and contains the pins 36. The pins 36 are parallel and can be mounted to the hub 34 by an interference fit therewith, soldering, or other suitable means.

The pins 36 can be made of steel, brass, or other materials; however, a hardened material is preferred to minimize wear due to abrasion. Such materials are well known in the machine design art and need no exposition here. Pin 36 diameter is not critical, but desirably should range from about .030 inch to about .070 inch; for example, successful tests have been conducted with the apparatus using pins of .036 inch, .042 inch, and .043 inch diameters. Length of the pins 36 is not critical; however, they desirably should extend from about .5 inch to about 1 inch below the plate 37 to assure adequate length for the point and fabric penetration, yet not be so long as to be unduly subject to lateral bending. The pins 36 can contain a straight tapered point or a curved point such as is found on ordinary sewing and darning needles. In this connection, a pin 36 with a 30° total included straight taper angle has been successfully used, and a common .043 inch diameter darning needle with a .20 inch long curved point has also been successfully demonstrated.

The number and arrangement of pins 36 likewise is subject to variation but desirably such quantity falls within the range of from 1 to about 30. In this respect, however, it is preferred to have more than one pin 36 to obviate the necessity of employing accessory means for maintaining tautness in the fabric sample during testing. When a fabric sample is loosely laid on the receiver 38 (described below) and two or more pins 36 simultaneously engage the sample, the pins 36 will penetrate the sample and enter the receiving holes 45 without tending to force fabric around themselves and into the holes 45 before penetrating. Any tendency of one pin 36 to so force the fabric into the holes 45 will be resisted by tightening of the fabric as other of the pins 36 simultaneously hold the fabric in place on the receiver 38. If only one pin 36 is used, accessory means such as clamps to fasten a sample to the receiver 38 must be used to prevent the pin 36 from forcing the sample into the receiving hole 45 before it penetrates the sample thereby giving an erroneous reading. Another accessory means which might be used to accomplish the same purpose is a small frame, such as an embroidery hoop, in which a portion of the sample can be tautly clamped and which can be placed on the receiver 38.

Additional advantage is gained from using a plurality of pins in that a number of penetration points will average local variations in penetration resistance, thereby precluding unduly high or low readings caused by small local fabric imperfections.

The rack 20 is an ordinary gear drive element which is made to engage with the pinion 22 shown in FIG. 2 and through which linear motion is transmitted to the head assembly 16. The rack and its mating pinion can contain any conventional gear tooth form and can be made of brass, bronze, steel, stainless steel, nylon or other suitable gear material.

The rack 20 is driven through the pinion 22, shown in FIG. 2, by a drive unit comprising an electric motor 32 (most readily seen in FIG. 1) and a gearbox 30. The motor is sized to provide sufficient torque to drive the pins 36 through a fabric sample at a constant speed which should desirably be within the range of from about 1 to about 5 inches per minute. The motor torque and speed rating, of course, depend upon the number of pins 36 on the apparatus, the material to be tested, and the desired speed with which the pins 36 penetrate a fabric sample. On a testing apparatus containing twenty-four .043 inch diameter pins, a 5 watt motor geared down to drive a .625 inch pitch diameter pinion 22 at a speed of 1 r.p.m. was found adequate to test materials such as cotton diapers and terry towels and washcloths.

Figure 8:
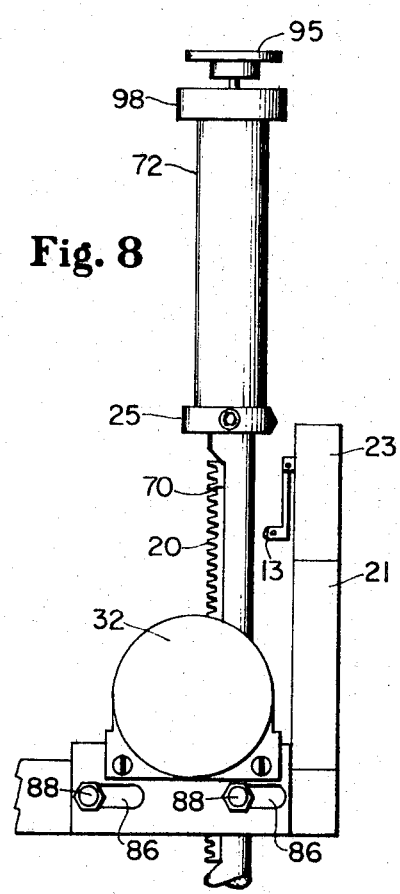
FIG. 8 is a fragmentary view of the apparatus taken along the line 8—8 of FIG. 1.

As shown by FIG. 2, the pinion 22 is normally engaged with the rack 20. Upon completion of a test sample pentration it is desirable, however, to disengage the rack 20 and pinion 22 to allow manual movement of the head assembly 16 so that the pins 36 may be retracted from the holes 45 and the fabric sample readily removed from the testing apparatus. To facilitate such disengagement, the motor 32 and gearbox 30 are mounted on a plate 33, as shown in FIGS. 8 and 9, which is in turn slideably mounted on the drive support member 12. The slideable mounting of the plate 33 to the drive support member 12 can be effected as shown in FIG. 8 using slotted holes 86 through which shoulder screws 88 are fastened to the drive support member 12. As shown in FIG. 9, a release 24 is provided which normally engages a hole 89 in the plate 33 to keep the pinion 22 and rack 20 engaged, but which may be released to allow movement of the drive unit and disengagement of the rack 20 and pinion 22.

Constant speed driving means, though preferred, are not essential to the method of this invention. For example, a means such as an air cylinder or other linear actuator not adapted to operate at constant speed could be substituted for the drive comprising the electric motor 32, gearbox 30, rack 20, and pinion 22. Similarly, a lever could be provided to facilitate manual operation of the apparatus. The constant speed drive, however, exhibits certain advantages over the alternatives. It is preferable to manual operation as it precludes the possibility of static friction effects on the force reading being created by erratic manual operation of the apparatus. The constant speed drive is preferable to non-constant speed actuators in that the latter may cause discrepancies in results due to variations in friction factor with speed or other effects.

The collar 25 is mounted on the shaft 17 with a set screw or other means so that its axial position on the shaft 17 is adjustable. The collar is positioned such that it will actuate the lever 13 of the normally closed limit switch 23 when the head assembly 16 is in its lowermost desired position. Actuation of the switch 23 (which is mounted to the drive support member 12 with a bracket or other means 21) opens the electrical circuit to the drive motor 32 (shown in FIG. 1) thereby preventing or stopping further downward travel of the head assembly 16.

The receiver 38, referred to above, is a circular block or plate of metal or other rigid material containing holes 45. The holes, equal in number and identically located relative to each other with the pins 36, are somewhat larger than the pins they are designed to receive. The holes 45 must be sufficiently large in comparison with the pins 36 that threads broken when the pins 36 penetrate a fabric sample and forced into the holes 45 by the pins 36 will not cause binding between the pins 36 and holes 45. In this connection, holes 45 whose diameters are about 2.8 to about 4.5 times as large as the pin 36 diameter, and preferably from about 3 to about 4 times as large as that of the pins 36, are desirable for testing terry cloth, and a hole 45 to pin 36 diameter ratio ranging from about 1.9 to about 5, and preferably from about 2 to about 4, is desirable for testing smooth surface cottons. The embodiment described contained, for example, one-eighth inch diameter receiving holes 45 to receive .043 inch diameter pins 36.

The receiver 38 is mounted in a recess provided on the platform 39, and is held in place by a set screw 41. Thus, the receiver 38 may be readily removed and replaced with an alternate receiver 38 having a different hole size.

The platform 39 is slideably mounted on rods 40 through bearings 42 (see FIGS. 1 and 3), which are contained in the platform 39 and the alignment member 15, and is supported vertically by the force measuring apparatus. Hence, when a fabric sample which has been laid on the receiver 38 is penetrated by the pins 36, the penetration force is transmitted through the platform 39 to the force measuring apparatus.

Referring to FIGS. 1 and 5, the force measuring apparatus comprises a flat spring or beam 48 simply supported on dowels 50 and axially constrained by the presence of end plates 56, a motion transducer 80 (see FIG. 2) and a means of adjusting the sensitivity of the force measuring apparatus. Line contact of the slideable platform 39 and the simply supported beam 48 is effected through the dowel 46 which is fastened to the underside of the platform 39 as shown in FIG. 5.

The means for adjusting the sensitivity of the force measuring apparatus comprises means of changing the effective length of the beam 48, a long beam offering less resistance to motion of the platform 39 than a short beam. The effective length change is accomplished by mounting the beam support dowels 50 on carriage blocks 52 which are in turn slideably mounted on carriage rods 54 as shown in FIG. 6. Spacing of the carriage blocks 52 is adjusted by the lead screw 58 which is axially constrained by the bracket 60 as indicated by FIGS. 5 and 7, and which is rotatably supported by a suitable journal-bearing arrangement with end plates 56. A handwheel 62 is provided at one end of the lead screw 58, and a pointer 64 and scale 66 are provided as shown in FIG. 1 for indicating the spacing between the dowels 50.

The beam 48, itself, can vary in dimensions and materials to provide the force-displacement characteristics required by the applications, such permissible variations being well known to persons skilled in machine design, so that further exposition is not here required. As an example, however, an AISI 1050 steel beam whose effective length was adjustable from 1½ to 7 inches and was 1/16 inch thick by 1 inch wide has been found satisfactory for testing a broad spectrum of fabrics.

The motion transducer 80 can be a potentiometer, linear variable differential transformer, or other device which will convert the small movement of the platform 39 into an electrical signal which can be measured with an electrical meter and/or charted on a recording instrument to give a record of load versus time or pin travel. One embodiment of the described apparatus which was constructed used a linear variable differential transformer (LVDT) with an integral vibrator and rectifier whose motion was measured by a 0 to 1 milliampere D.C. ammeter interconnected in series with the LVDT and a 6 volt D.C. power supply. Additionally, the LVDT was electrically interconnected with a strip chart recorder to record load versus time. One suitable LVDT which is available commercially is sold by G. L. Collins Corporation and identified as Model 55–103 Linear Motion Transducer.

An alternative to electrically measuring the movement of the platform 39 is the use of a dial indicator or other mechanical device to amplify the platform's motion so that it is discernible to the unaided eye.

Though the force measuring apparatus described above is preferred to facilitate testing a wide range of materials and treatments over wide force ranges, any commercially available force transducer will work satisfactorily if chosen for the force range in which operation is desired.

The apparatus of this invention can be constructed of common machine construction materials whose use and application are well known to persons skilled in the machine design art, such as plastics, steel, stainless steel, and aluminum. Bearings 18 and 42 may be sleeve bearings of bronze or other material or may be of the recirculating ball type which are constructed to permit linear motion through the bearing.

Before use, the machine must be calibrated mechanically to adjust sensitivity of the force measuring apparatus so that it will operate in the proper range for the fabric and treatment being tested. To mechanically calibrate the apparatus, the effective length of the beam 48 is adjusted by turning the handwheel 62 until a full range response on the indicating device (such as the milliammeter referred to above) is achieved over the force range of interest for the test. For example, if terry cloth towels and washcloths which have been treated with fabric softening solutions are to be tested using twenty-four .043 inch diameter pins 36 and one-eighth inch diameter holes 45, the effective length of the beam 48 is desirably adjusted so the milliammeter or other indicating device will fully respond over a 0 to 20 kilogram weight load on the receiver 38. If cotton diapers are to be tested, the instrument is desirably adjusted as described to respond to a 0 to 10 kilogram weight load on the receiver 38. If then, for example, a penetration of a given sample by the pins 36 caused the indicating device to register 75% of full scale, the penetration force would equal 75% of the calibration load, i.e., in the examples cited above, 7½ or 15 kg. force, respectively, for the latter and the former.

After calibration as described above, the instrument is operated as follows. First, the pins 36 are cleaned of any oily substance which may have accumulated thereon during prior tests by driving them through paper or other lightly abrasive substance. (This cleaning step must be repeated before each sample in a group being compared is tested.) The pinion 22 and rack 20 are then disengaged as hereinbefore described, the head assembly 16 is raised to remove the pins 36 from the receiver 38 and the cleaning paper is removed from the pins 36 by pressing knob 95 downwardly whereby plate 37 performs the desired stripping action. Next, the pinion 22 and rack 20 are reengaged, a sample is placed on the receiver 38, and power switched to the motor 32. The motor 32 drives the pins 36 into the sample at a constant speed, causing increasingly larger separation of fabric fibers around the pointed pins 36 as fabric penetration progresses. Separation of the fibers around the pins 36 is accompanied by fiber compression and bending and sliding among adjacent fibers. Resistance of the sample to these interactions with the penetrating pins 36 causes a combination of frictional and mechanical reaction forces to be transmitted to the receiver 38, to the platform 39, and thence to the force measuring apparatus. Thus, the method and apparatus measures the effects of fiber compression, fiber flexibility, interfiber lubricity, and pin-to-fabric lubricity. Fabric softeners function primarily by depositing a lubricant on and among the fibers in a fabric. The method of this invention, by more completely measuring the complexity of properties affected by this lubrication, thus more accurately measures the softening effect of the treatment.

After the steps recited above have been completed, the head assembly 16 is raised as hereinbefore described and the fabric sample is removed from the pins by depressing the knob 95. The steps recited above are then repeated for each sample desired to be tested. Softness comparison can be made among the members of a group of samples by noting the force of penetration resistance for each sample in the group and comparing them, lower penetration forces denoting softer fabric. The softness comparison thus made among the members of the group of samples reflects both quantitatively and qualitatively the comparative softness of the members of the group, and thus provides a comparison of the efficacy of the treatments which the respective samples received.

Actual tests with the apparatus of this invention have been compared to the results of tactile examination by human test panels and found to be significantly correlative therewith. For example, in one such comparison two sets of five samples each were prepared. The samples in each set were given various differing treatments except that the second set contained a sample which had been given a treatment identical with that of one sample in the first set. The two sets were submitted to two different test panels and graded in a statistically determined incomplete block design in which each panelist compared various samples as standards against certain of the remaining samples. The order of sampling was structured so that the panelists' evaluations could be manipulated to yield results which would have been had if each panelist had compared each sample as a standard against every other sample; that is, if samples 2–5 had been graded against sample 1, samples 1, 3, 4, and 5 had been graded against sample 2, samples 1, 2, 4, and 5 had been graded against sample 3, samples 1, 2, 3, and 5 had been graded against sample 4, and samples 1–4 had been graded against sample 5. As a panelist made each of the comparisons, he assigned numerical scores to each sample which indicated his judgment of the softness of every sample in the group being tested relative to the particular sample of the group being used as a standard; for example, numerical scores were assigned which indicated the softness of each of samples 2–5 relative to sample 1. The scores assigned ranged numerically from 0 to 4 whereby 0 means a particular sample is equivalent in softness to the standard, 1 means the sample is, to a low degree of confidence, somewhat softer than the standard, 2 means the sample is, to a high degree of confidence, somewhat softer than the standard, 3 means the sample is considerably softer than the standard, and 4 means the sample is greatly softer than the standard. If the panelist concluded that the standard was softer than the particular sample being evaluated, he assigned a negative score according to the scoring system; for example, a score of negative 2 meant the standard was, to a high degree of confidence, softer than the sample under consideration.

The scores obtained as outlined above were then statistically manipulated to minimize effects due to differences in human sensitivity and the tendencies of panelists to be biased according to the order in which the samples were touched or for other reasons, and overall softness ratings were established for each sample which reflect the 0 to 4 scale referred to above. Because the samples were evaluated in an order pattern which in effect yielded scores from grading the samples in both a forward and reverse order, the average of the overall softness ratings was equal to zero, and the overall softness rating, which may be negative or positive, represented the deviation of the particular sample from the average of the samplings in the test group.

After the tactile softness ratings were established, each of the two sets of samples was tested with the apparatus of this invention. The apparatus was first calibrated as hereinbefore described so that a 20 kilogram weight on the receiver 38 would cause the D.C. milliammeter to respond at full scale. The test procedure hereinbefore described was then performed for each of the samples and ammeter readings were obtained which represented a percentage of the 20 kilogram calibration weight load. The average of these readings was then determined and the deviation of each reading from the average was calculated. These deviations were then compared with the overall panel softness ratings for the same samples.

The values derived for comparison from the apparatus tests and the panel tests were those listed in the following table.

| Treatment | Apparatus test (milliamps) | | Panel test, overall softness rating |
|---|---|---|---|
| | Raw score | Deviation from avg. | |
| Set No. 1: | | | |
| 1 | 80.6 | +17.4 | −.960 |
| 2 | 81.2 | +18.0 | −.507 |
| 3 | 59.8 | −3.4 | +.280 |
| 4 | 50.5 | −12.7 | +.627 |
| 5 | 44.0 | −19.2 | +.560 |
| Set No. 2: | | | |
| 5 | 53.0 | −3.2 | .307 |
| 6 | 77.5 | +21.3 | −.840 |
| 7 | 57.0 | +.8 | −.160 |
| 8 | 52.5 | −4.7 | .213 |
| 9 | 41.0 | −15.2 | .480 |

It was statistically determined that for each set of data the deviation of the apparatus derived scores from the average apparatus reading was linearly related to the overall softness rating obtained from the panel test, and the slopes of the lines defining the relationships were found to be equal. The line defining the relationship has a negative slope; that is, negative deviation from average with the apparatus score denotes softer than average samples whereas positive panel scores denote softer than average samples.

The scores obtained for each set of samples were then combined into a single set of data by adjusting the panel scores for set No. 2 upwardly by .253 panel score (which is the difference between the two panels' scoring of samples treated with treatment 5, the treatment common to both sets of samples). The combined data yielded the adjusted panel scores and deviations from average apparatus reading for the combined data shown in the following table.

| | Apparatus test (milliamps) | | Adjusted panel score |
|---|---|---|---|
| | Raw score | Deviation from avg. | |
| Treatment: | | | |
| 1 | 80.6 | +19.6 | −.960 |
| 2 | 81.2 | +20.2 | −.507 |
| 3 | 59.8 | −1.2 | +.280 |
| 4 | 50.5 | −10.5 | +.627 |
| 5 | 48.5 | −12.5 | +.560 |
| 6 | 77.5 | +16.5 | −.587 |
| 7 | 57.0 | −4.0 | +.093 |
| 8 | 52.5 | −8.5 | +.466 |
| 9 | 41.0 | −20 | +.766 |

Statistical analysis established that the combined data was expressible in the relationship, $y = -.0385X$, where $y$ is the adjusted panel score and $X$ is the deviation of a given apparatus reading from the average of all the apparatus readings in the group. Thus, it was demonstrated that the force causing penetration of a fabric sample is representative of the fabric softness and correlative with tactile softness evaluations, softer samples yielding lower force readings. For example, as can be seen by referring to the table above, sample 9 was indicated softer than sample 8 by both the pin penetration test and tactile examination.

Usefulness of this invention can be extended by establishing a standard "zero" softness fabric treatment and establishing, for each type of fabric which will be treated, the force required to penetrate the "zero" softness sample. All future testing can then be referred to the established softness scale.

Any fabric treatment which depends for its efficacy upon absorption by and coating of individual fabric fibers most probably has a determinable lubricant quality. A further use, therefore, of the method and apparatus described herein is measuring the efficacy and completeness of fabric treatments other than softeners by measuring fabric penetration resistance and thereby measuring the complexity of properties described above.

What is claimed is:

1. A method of determining the comparative softness of two fabric treatments comprising the steps of:
   (A) treating a fabric sample with one of said fabric treatments and treating a substantially similar fabric sample with the other of said fabric treatments;
   (B) placing a so-treated fabric sample on a receiver containing a plurality of holes;
   (C) penetrating said fabric sample with a plurality of parallel pointed pins driven at constant speed through the said fabric sample and into the said holes, and measuring the force required to penetrate the fabric sample;
   (D) withdrawing the said pins from said holes and removing said fabric sample;
   (E) cleaning the pins of any lubricant matter and fabric soil;
   (F) repeating in sequence steps (B) and (C) with the second of the so-treated samples; and
   (G) comparing the force value obtained with each of said fabric samples in step (C).

2. An apparatus for measuring the penetration resistance of a fabric, comprising a plurality of pointed pins adapted to pierce said fabric, a means of rigidly constraining said pins in a spaced parallel relationship with each other, a receiver having a surface generally normal to the axis of said pins and adapted to support said fabric for penetration resistance measurement, said surface defining a plurality of holes aligned wtih said pins and sized to receive the same in loose telescoping relation, a constant speed electric motor interconnected with said pointed pins in a fixed speed ratio relationship for moving the said pins and receiver at constant speed relative to each other from a spaced-apart relation to a relation wherein the pin points have pierced said fabric and are positioned wholly within the said holes, and a means for measuring the forces applied to the receiver as the said pin and receiver are so moved.

3. The apparatus of claim 2 wherein the force measuring means comprises, in combination, the said receiver, means of lateral support to which the said receiver is slideably mounted, and a force transducer vertically supporting said receiver whereby the force transmitted to the said receiver can be measured.

4. An apparatus for measuring the penetration resistance of materials comprising in combination:
   (A) a structural frame, comprising a base, a vertical column extending upwardy from the rear center of said base, and a drive support member fastened to the top of said column and extending forward from said column above and across said base;
   (B) a linear bearing contained in the outer end of said drive support member and oriented with its axis vertically disposed;
   (C) a head assembly supported in said linear bearing, comprising a shaft supported in said bearing, a pin mounting hub fastened to the lower end of said shaft, a plurality of pointed pins rigidly fastened to said hub in a parallel relationship, a plate slideably mounted over said pins, a means for moving said plate across said pins whereby to strip an impaled material sample from said pins, and a rack fastened to said shaft;
   (D) a drive unit mounted to said drive support member comprising an electric motor, a fixed ratio speed reducer integrally fastened to said electric motor, and a pinion whereby to engage the drive unit with the aforesaid rack, said drive unit being slideably mounted to said drive support member whereby to facilitate rapid disengagement of the aforesaid rack and pinion;
   (E) a receiver slideably mounted on vertical rods, said receiver having a surface generally normal to the axis of the aforesaid pins and adapted to support a material for penetration resistance measurement, said surface defining a plurality of holes aligned with said pins and sized to receive the same in telescoping relation; and
   (F) a force measuring apparatus supporting said receiver, said force measuring apparatus comprising a simply supported resilient beam, a dowel attached to the underside of said receiver and positioned on the longitudinal center of said beam, end supports beneath said beam, rods slideably carrying said end supports, end plates axially constraining said beam and carrying said rods, a lead screw journaled to said end plates and threadedly interconnected with said end supports so as to maintain said end supports equidistant from the center of said beam, and a motion indicating apparatus connected to said receiver.

5. The apparatus of claim 4 wherein said motion indicating apparatus comprises a linear variable differential transformer containing integral vibrator and rectifier circuits; direct current milliammeter, and a six volt direct current power supply interconnected in a series relationship.

References Cited

UNITED STATES PATENTS

| | | | |
|---|---|---|---|
| 2,227,216 | 12/1940 | Christel | 73—81 |
| 2,472,047 | 5/1949 | Ruge | 201—63 |
| 2,522,544 | 9/1950 | Seyboth. | |
| 2,588,387 | 3/1962 | Hughes. | |
| 2,656,716 | 10/1953 | Hoggatt | 73—81 |
| 3,026,726 | 3/1962 | Reading. | |
| 3,151,483 | 10/1964 | Plummer. | |
| 3,201,976 | 8/1965 | Starrett et al. | |

OTHER REFERENCES

Labounsky: Abstract of Ser. No. 656,466, filed Mar. 22, 1946, published in 650 OG 598, on Sept. 11, 1951.

RICHARD C. QUEISSER, Primary Examiner

E. J. KOCK, Assistant Examiner

U.S. Cl. X.R.

73—159